N. A. COBB.
MECHANICAL MICROSCOPE STAGE.
APPLICATION FILED APR. 9, 1912.
1,187,970.
Patented June 20, 1916.
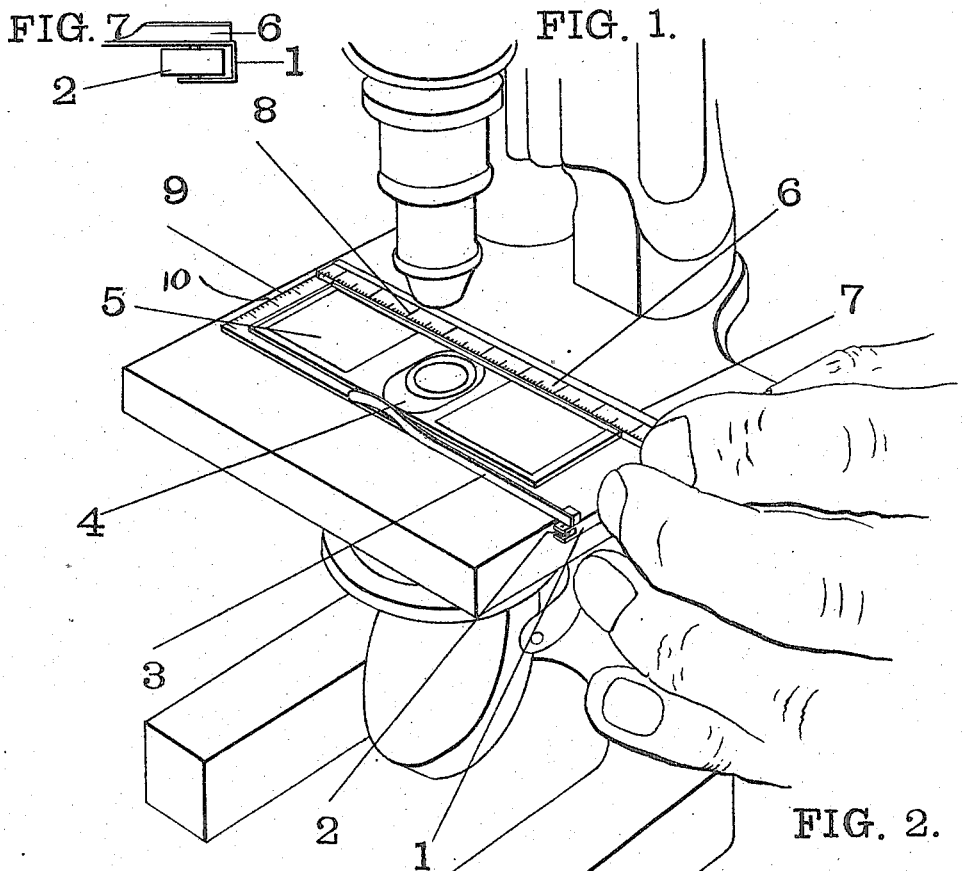
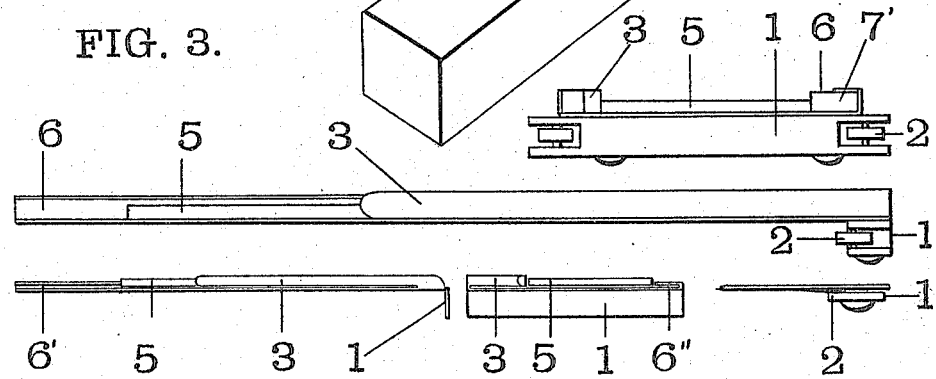

UNITED STATES PATENT OFFICE.

NATHAN AUGUSTUS COBB, OF FALLS CHURCH, VIRGINIA.

MECHANICAL MICROSCOPE-STAGE.

1,187,970.  Specification of Letters Patent.  Patented June 20, 1916.

Application filed April 9, 1912. Serial No. 689,661.

*To all whom it may concern:*

Be it known that I, NATHAN AUGUSTUS COBB, a citizen of the United States, residing at Falls Church, in the county of Fairfax and State of Virginia, have invented a new and useful Mechanical Microscope-Stage, of which the following is a specification.

The ordinary mechanical microscope stage is a mechanism by means of which it is possible to move the microscope slide in two well-defined paths, intersecting each other in such a manner that the intersections constitute a plane surface. The microscopic object, on the slide, moves in a plane parallel to the stage of the microscope. The object of the mechanism is to move the microscopic object about on the stage of the microscope in a manner that has advantages over a free hand movement.

My mechanical stage differs from others in that it is not attached to the stage of the microscope. It is to be held by hand against the stage of the microscope, and is made to slide back and forth against the edge of the stage of the microscope. If the hand of the operator is withdrawn there is nothing to prevent my stage from falling out of position, which it will do of itself if the stage of the microscope is inclined, as it often is when in use. My stage is of little use as an accurate mechanical stage unless held by the hand of the operator. It is mechanical in a simple sense, to the extent that the microscope slide is held in position, by a spring, in such a way that it can be moved along the stage as required, and to the extent that the stage itself can be moved in a direction at right angles to that just described, by sliding it along the edge of the microscope stage by hand. By this simple means the object to be examined is moved upon a series of rectangular coördinates, so that any part of it may be brought under the lens of the microscope. For searching and recording my stage has all the advantages that go with such a system of movements. It is truly mechanical in that the movements in both directions are mechanically controlled by two planes: 1. The plane of the edge of the stage of the microscope. 2. The plane of the flange or scale against which the slide is held by the pressure of the spring.

My mechanical stage has the following advantages: 1. It does not have to be unscrewed or unracked to remove it from the microscope stage. 2. This instant removal determines a second advantage, namely, the microscope slide can be placed in any desired position on my stage with great convenience, because the mechanical stage can be quickly removed and held so as to facilitate the reading of the scale that indicates the position of the slide. 3. The simplicity of my mechanical stage is in its favor in that it is unlikely to get out of order either through wear or misuse. 4. My mechanical stage can be used at a high rate of speed because of its freedom from screws, racks and pinions. This makes it useful in the rapid searching of preparations. 5. It is inexpensive, so much so as to bring it within the means of laboratories where apparatus is applied for the use of students. 6. It is extremely small and portable. All these advantages I have sought to incorporate in my mechanical stage in a convenient form suggested by many years of experience as a practical microscopist.

Figure 1 is a perspective view of the lower part of a microscope showing my mechanical stage held in position on the stage of the microscope by the left hand of the operator. Fig. 2 shows the end elevation of the mechanical stage shown in Fig. 1, about twice natural size. Fig. 3 shows the front elevation of the mechanical stage shown in Fig. 1, about twice natural size. Fig. 4 shows the front elevation of a mechanical stage made from a single piece of material. Fig. 5 shows the end elevation of the stage shown in Fig. 4. Fig. 6 shows the front elevation of a part of a mechanical stage in which the downward-projecting bearing consists substantially of only two wide and flat anti-friction wheels and their axes, one of the wheels being hidden by the other in this view. Fig. 7 shows a front elevation of the end of one of the mechanical stages in which the bearings for the anti-friction wheels are made by bending at right angles one end of the thin metal of which the stage is made.

Similar numbers refer to similar parts throughout the several views.

Fig. 1 is a perspective view of the mechanical stage as it lies on the stage of a microscope, about full size. In this figure and throughout the drawings, 1 indicates the downward-projecting bearing, 2 one of the anti-friction wheels, 3 the spring that holds the microscope slide against the flange, 4 the aperture in the mechanical stage, 5 the microscope slide, 6 the movable bar or abutment bearing a scale and located in the groove formed by the flange, 7, and against which the microscope slide is pressed, the flange of the mechanical stage forming a groove to receive the bar 6, 8 the scale on the bar 6, 9 the scale on the end of the mechanical stage, serving to record the position of the mechanical stage with reference to the microscope stage, the corresponding fixed point being the single engraved line on the stage of the microscope. This engraved line is shown at 10. It will be noted that in Fig. 1 the mechanical stage stands at the tenth division of the scale, indicating that the rectangular coördinate of the position of the microscopic object at present in the field is 10, that is to say its distance from the lower edge of the slide is ten units.

In use my microscope stage is moved back and forth on the stage of the microscope by hand as shown in Fig. 1. The position of the slide, 5, is recorded by means of the two scales, 8 and 9. The position of the slide being recorded, then the position of any point on the slide is also recorded. The position of the slide on the mechanical stage is indicated by the point on the scale, 6, opposite which the end of the slide lies. The position of the mechanical stage on the microscope stage is indicated by the point on the scale, 9, opposite which the engraved line, 10, on the stage of the microscope lies. thus, in Fig. 1, calling the farthest main subdivision line of the scale 8, zero, and the farthest main subdivision line of the scale 9, zero, then the position of the slide shown in Fig. 1 would be recorded by the figures 0-10. The scale, 8, is movable so as to permit of bringing its zero mark to a convenient position for any particular microscope stage. The aperture, 4, is made wider than the aperture in the average microscope stage, so that within the limits of ordinary microscope construction there will be a passage for the light through the aperture, 4, notwithstanding the fact that this aperture may not be exactly opposite the aperture in the microscope stage. The slide, 5, is held in position against the abutment, 6, by means of the spring, 3. When thus held the mechanical stage may be moved back and forth so as to permit search on an area on the slide, 5, whose width will be equal to the width of the field of the microscope objective. This area having been searched, the slide, 5, is moved along the scale, 8, a distance equal to the width of the field of the microscope objective, and the next adjacent area on the slide, 5, can then be searched; so proceeding, the entire area of the microscopic object, or the entire area of the mount, can be systematically searched.

Fig. 2 represents the stage, twice natural size, showing the two anti-friction wheels and the groove, 7', into which is fitted the piece 6, forming an abutment on which is engraved the scale 8, shown in Fig. 1.

Fig. 3 shows a front elevation of the same mechanical stage. The thin material of which the stage is made is seen both above and below the bar, 6, and the microscope slide, 5.

Figs. 4 and 5 are presented to show the simplest form of my mechanical stage, here made of a single piece of material. In this form the groove is empty, and the scale (8, Fig. 1) is engraved on the top of the outside of the groove in a position corresponding closely with the position of the scale in Fig. 1. There are no anti-friction wheels in this form.

Fig. 6 shows one end of the mechanical stage in elevation, showing how the anti-friction wheels alone can be made to serve the purpose of a downward-projecting bearing, thus dispensing with the bar 1, shown in Figs. 1, 2, and 3. The wheels have for axes shouldered rivets. In this form the wheel is numbered both 1 and 2, on account of the simple nature of the construction.

Fig. 7 shows an elevation of a portion of one end of a mechanical stage in which the bearings for the anti-friction wheels are made by bending the thin material of which the main part of the stage is made. The material is shown bent round at 1. 2 shows one of the anti-friction wheels, the other being behind it. 6 shows the scale-bearing bar that fits into the grooved rabbet at the back of the stage.

I claim,

1. A mechanical microscope stage consisting of a thin flat piece of material perforated for the passage of light, and with a flange along one side and a spring on the other, and a downward-projecting bearing at one end.

2. A mechanical microscope stage consisting of a thin flat piece of material, a flange on one side and a spring on the other, and a downward-projecting bearing at one end, the bearing being fitted with anti-friction wheels.

3. A mechanical microscope stage with a grooved flange receiving a movable scale for the recording of the position of the microscope slide.

4. A mechanical microscope stage with a downward-projecting bearing at one end sliding loosely against the edge of the microscope stage.

5. A mechanical miscroscope stage with a grooved flange for the guidance of the slide, and a graduated piece fitting into the groove.

6. A mechanical microscope stage consisting of a thin flat piece of material with a flange on one side and a spring on the other, and a downward-projecting bearing at one end and a graduated scale at the other, and a fixed datum line for the scale on the stage of the microscope.

7. A mechanical microscope stage consisting of a thin flat piece of material with a perforation for the passage of light, a grooved flange carrying a sliding scale on one side for the guidance of the microscope slide and a spring on the other side to hold the microscope slide in place, a downward-projecting bearing at one end carrying anti-friction wheels, to bear on the edge of the microscope stage, and a graduated scale at the other end on the edge.

8. A mechanical microscope stage consisting of a single piece of material perforated for the passage of light, and with a flange on one side and a spring on the other, and with a downward-projecting bearing at one end.

9. A mechanical microscope stage consisting of a thin flat piece of material perforated for the passage of light with a downward-projecting flange at one end adapted to bear against the edge of the microscope stage so that in action substantially every part of the stage moves in a straight line in one direction.

NATHAN AUGUSTUS COBB.

Witnesses:
　Ruth Cobb,
　Alice V. Cobb.

Copies of this patent may be obtained for five cents each, by addressing the "Commissioner of Patents, Washington, D. C."